United States Patent
Kim et al.

(10) Patent No.: US 7,982,726 B2
(45) Date of Patent: Jul. 19, 2011

(54) DISPLAY DEVICE AND METHOD OF CHECKING INPUT SIGNALS

(75) Inventors: Young-Chan Kim, Urwang-si (KR); Jae-hyung Chang, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 366 days.

(21) Appl. No.: 10/654,618

(22) Filed: Sep. 4, 2003

(65) Prior Publication Data

US 2004/0105663 A1 Jun. 3, 2004

(30) Foreign Application Priority Data

Sep. 19, 2002 (KR) .................. 10-2002-0057321

(51) Int. Cl.
*G09G 5/00* (2006.01)
(52) U.S. Cl. .............. 345/204; 348/705; 725/59
(58) Field of Classification Search .......... 345/204, 345/206, 213, 3.1; 386/113, 116; 348/569–570, 348/661, 705–706, 571, 725, 731; 725/151, 725/139, 131, 100, 38, 59, 120

See application file for complete search history.

(56) References Cited

U.S. PATENT DOCUMENTS

| | | | | | |
|---|---|---|---|---|---|
| 4,507,683 | A | * | 3/1985 | Griesshaber et al. | 348/722 |
| 4,993,013 | A | * | 2/1991 | Shinada et al. | 370/242 |
| 5,276,436 | A | * | 1/1994 | Shaw et al. | 345/603 |
| 5,491,805 | A | * | 2/1996 | Welmer | 710/104 |
| 5,541,670 | A | * | 7/1996 | Hanai | 348/705 |
| 5,572,263 | A | * | 11/1996 | Kim et al. | 348/705 |
| 5,712,690 | A | * | 1/1998 | Kim | 348/570 |
| 5,757,366 | A | * | 5/1998 | Suzuki | 345/213 |
| 5,808,693 | A | * | 9/1998 | Yamashita et al. | 348/554 |
| 5,886,545 | A | * | 3/1999 | Sakuda et al. | 327/99 |
| 6,122,018 | A | * | 9/2000 | Sugihara et al. | 348/705 |
| 6,131,128 | A | | 10/2000 | Lee | |

(Continued)

FOREIGN PATENT DOCUMENTS

CN 1156379 A 8/1997

(Continued)

OTHER PUBLICATIONS

Office Action issued from the SIPO on Jan. 7, 2005, for corresponding Chinese Patent Application No. 013158959.6.

(Continued)

*Primary Examiner* — Stephen G Sherman
(74) *Attorney, Agent, or Firm* — Staas & Halsey LLP

(57) ABSTRACT

A display device and a method of checking signals input to a display device. The display device includes a signal identifying unit, a signal checking unit, and a signal changing unit. The signal identifying unit receives an input signal and identifies the type of input signal that is received. The signal checking unit checks whether the identified input signal is abnormal. The signal changing unit switches from the checked input signal to a next input signal to be checked so that the signal checking unit can check whether the next input signal is abnormal, after the signal checking unit checks whether the input signal is abnormal. Accordingly, when a display device goes to an abnormal mode, one of input signals can be checked in the display device to automatically change to another signal according to the order of checking the signals, the time required to check the signals, and the number of times the signals are checked without manipulating an additional key.

50 Claims, 6 Drawing Sheets

U.S. PATENT DOCUMENTS

| | | | |
|---|---|---|---|
| 6,172,712 B1 * | 1/2001 | Beard | 348/552 |
| 6,559,893 B1 * | 5/2003 | Martin | 348/554 |
| 2001/0027537 A1 * | 10/2001 | Nada et al. | 714/23 |
| 2002/0060676 A1 | 5/2002 | Kim | |
| 2002/0186320 A1 * | 12/2002 | Carlsgaard et al. | 348/468 |
| 2005/0179822 A1 * | 8/2005 | Takano et al. | 348/705 |

FOREIGN PATENT DOCUMENTS

JP      2001-008115      1/2001

OTHER PUBLICATIONS

European Search Report for corresponding European Application No. 03255851.2-1228; dated Sep. 16, 2010.

\* cited by examiner

DISPLAY DEVICE AND METHOD OF CHECKING INPUT SIGNALS

CROSS-REFERENCE TO RELATED APPLICATIONS

This application claims the priority of Korean Patent Application No. 2002-57321, filed on Sep. 19, 2002, in the Korean Intellectual Property Office, the disclosure of which is incorporated herein in its entirety by reference.

BACKGROUND OF THE INVENTION

1. Field of the Invention

The present invention relates to a display device, and more particularly, to a display device and a method of checking signals input to the display device according to a set checking order.

2. Description of the Related Art

If a currently displayed signal is abnormal, conventional display devices enter a saving mode or display a warning message to a user. In this situation, if the user desires to check another input signal, signal changing has to be performed using a signal changing key of a display device. If necessary, signals are changed several times through an input key. Thus, it takes a large amount of time to change the signals, and the user has to manipulate the signal changing key when changing the signals.

SUMMARY OF THE INVENTION

Accordingly, the present invention provides a display device which, if input signals are abnormal, automatically changes the input signals according to a signal checking order, the number of times the input signals are checked, or the time required to check the input signals set by a user. The present invention further provides a method of checking signals input to the display device.

According to an aspect of the present invention, there is provided a display device including a signal identifying unit, a signal checking unit, and a signal changing unit. The signal identifying unit receives an input signal and identifies the type of input signal that is received. The signal checking unit checks whether the identified input signal is abnormal. The signal changing unit switches from the checked input signal to a next input signal so that the signal checking unit can check whether the next input signal is abnormal, after the signal checking unit checks whether the identified input signal is abnormal.

According to another aspect of the present invention, there is also provided a method of checking a signal input into a display device. The input signal is received and the type of input signal that is received is identified. Whether the identified input signal is abnormal is checked. The checked input signal is switched to a next input signal to check whether the next input signal is abnormal, after whether the identified input signal is abnormal is checked.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
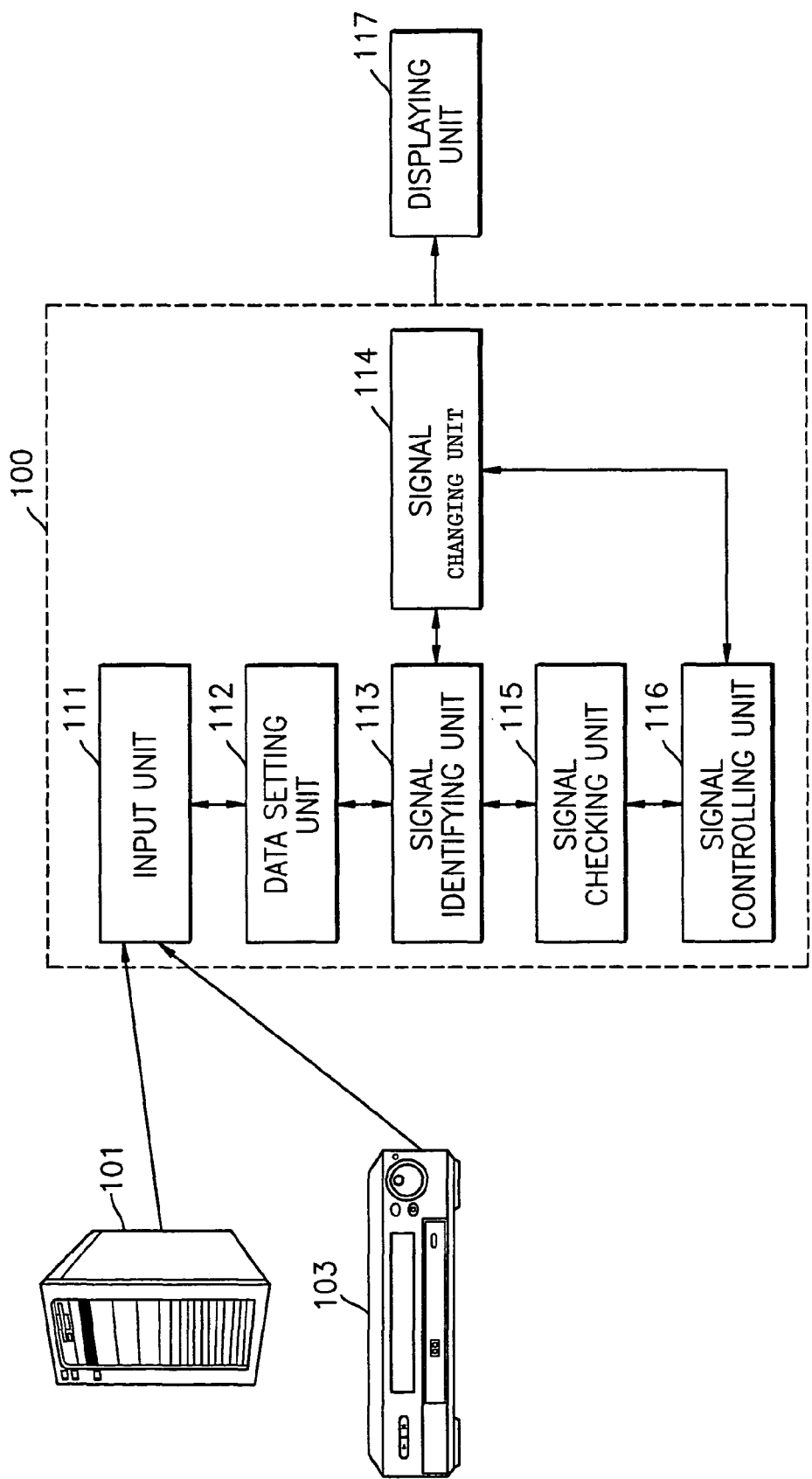
FIG. 1 is a block diagram of a display device according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a display device according to an embodiment of the present invention. Referring to FIG. 1, an input unit 111 receives signals from a computer 101, a digital versatile data (DVD) displayer 103, a television (TV) set (not shown), a VCR (not shown), or the like. The input unit 111 may include a plurality of ports, which are used only to receive a PC analog signal, a PC digital signal, a TV signal, a VIDEO signal, an S-VIDEO signal, and a digital TV (DTV) signal. The input unit 111 may also include a port used only to receive digital signals and a port used only to receive analog signals.

A user designates and inputs data on the number of times signals are checked, the time required to check the signals, and the order of checking the signals, by watching a screen of a display unit 117 displayed according to an on-screen display method. Then, a data setting unit 112 receives and sets the data. A signal identifying unit 113 identifies ports of input signals to identify the types of the input signals, e.g., a D-sub analog signal, a DVI analog signal, a DVI digital signal, or a VIDEO signal. In other words, since a display device 100 includes a port to input analog signals and a port to input digital signals, the signal identifying unit 113 identifies the ports to identify the types of signals. A signal changing unit 114 moves from a checked signal to a next signal to be checked. Then a signal checking unit 115 checks whether a signal is found to be abnormal. Thus, signals set as objects to be checked to determine if they are abnormal are checked according to the checking order set by the data setting unit 112.

After the signal identifying unit 113 has identified the types of signals, a signal checking unit 115 can check whether the signals are abnormal by decoding the signals or by checking whether signal cables are connected to the display device 100. For example, the signal checking unit 115 can check whether H and V signals are abnormal according to a sync processor's determination and check whether a VIDEO signal or a TV signal output from a decoder decoding a VIDEO or TV signal is abnormal. If a checked signal is abnormal, a signal controlling unit 116 checks the number of times the signals were checked, the time required to check the signals, or the order of checking the signals. The signal controlling unit 116 then selects one of the signals to be checked following the checked signal, and sets conditions of the selected signal containing data on an input port corresponding thereto. The display unit 117 displays input signals and data set by the data setting unit 112.

Figure 2:
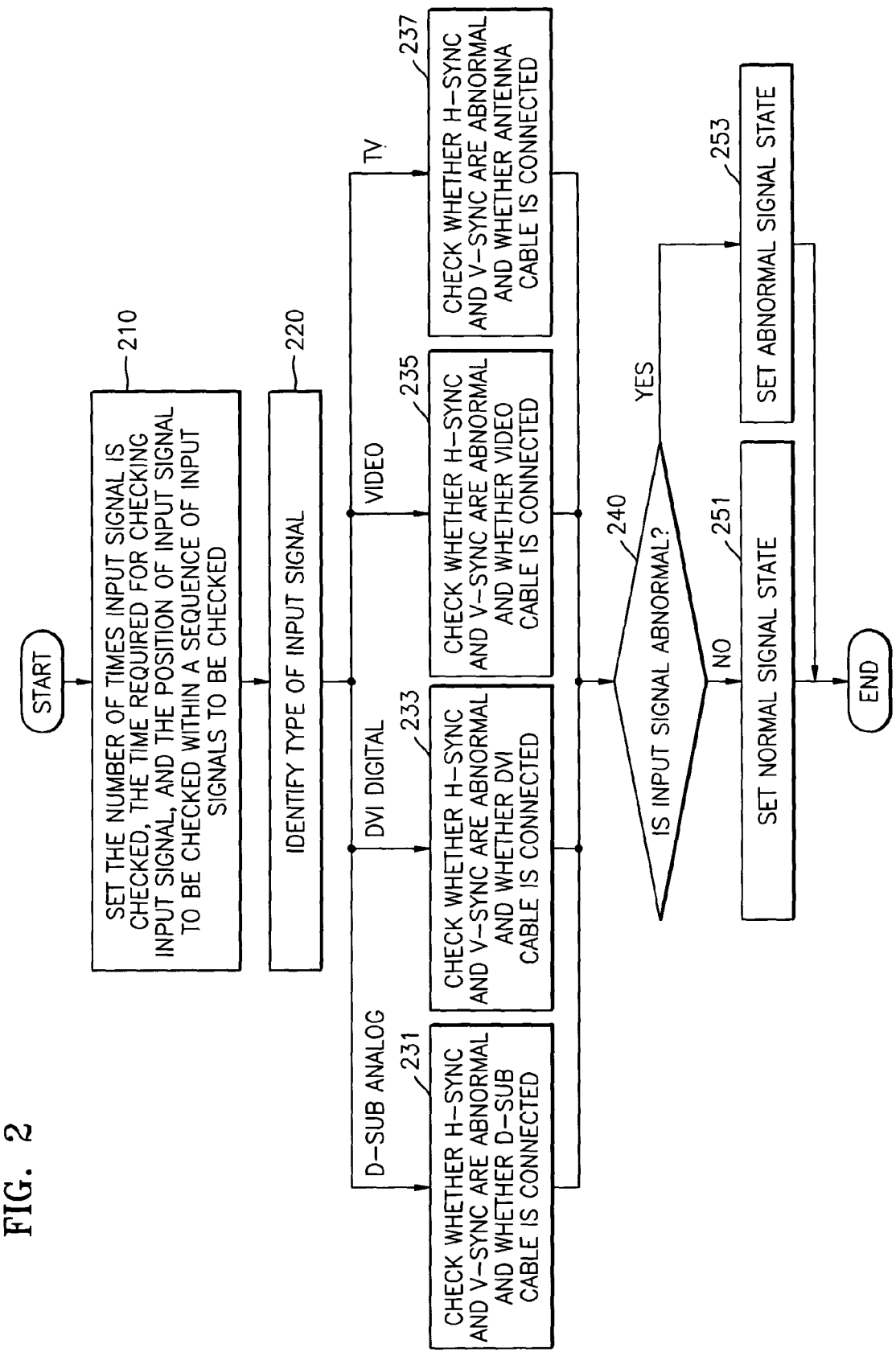
FIG. 2 is a flowchart for explaining a method of checking a signal input to a display device according to an embodiment of the present invention.

FIG. 2 is a flowchart for explaining a method of checking signals input to a display device according to an embodiment of the present invention.

The display device 100 receives and displays various types of signals, e.g., a PC analog signal, a PC digital signal, a TV signal, a VIDEO signal, an S-VIDEO signal, a DTV signal, and the like, to a user. In operation 210, the user designates data on the number of times signals input from the computer 101, the DVD player 103, a TV, or a VCR are checked, the time required to check the signals, the order of checking the signals, seeing a screen of the display unit 117 displayed according to an on-screen display method and inputs data to the displayer 117, and then the data setting unit 112 sets data on checked input signals.

If signals are input from the computer 101, the DVD player 103, the TV, or the VCR, in operation 220, the signal identifying unit 113 identifies input ports to identify the types of signals to be checked. If the types of signals to be checked have been identified, the signal checking unit 115 checks whether the signals are abnormal by decoding the signals and by checking whether signal cables are connected to the display device 100. In other words, in operation 231, the signal checking unit 115 checks whether H-sync and V-sync patterns of a D-sub analog signal are abnormal, e.g., whether one of the H-sync and V-sync patterns are not input or one of the input H-sync and V-sync patterns is abnormal, and whether a D-sub cable is connected to check whether the D-sub signal is abnormal. In operation 233, the signal checking unit 115 checks whether H-sync and V-sync patterns of a digital visual interface (DVI) digital signal are abnormal and whether a DVI cable is connected to check whether the DVI digital signal is abnormal. In operation 235, the signal checking unit 115 checks whether H-sync and V-sync patterns of a VIDEO signal are abnormal and whether a VIDEO cable is connected to check whether the VIDEO signal is abnormal. In operation 237, the signal checking unit 115 checks whether H-sync and V-sync patterns of a TV signal are abnormal and whether an antenna cable is connected to check whether the TV signal is abnormal.

The signal changing unit 114 checks the number of times the D-sub analog signal, the DVI digital signal, the VIDEO signal, and the TV signal are checked, the time required to check the D-sub analog signal, the DVI digital signal, the VIDEO signal, and the TV signal, and the order of checking the D-sub analog signal, the DVI digital signal, the VIDEO signal and the TV signal. Also, this signal changing unit 114 moves from a signal that has been checked from along the D-sub analog signal, the DVI digital signal, the VIDEO signal, and the TV signal to a new signal from among the same signals to be checked by the signal check unit 115.

In operation 240, the signal checking unit 115 checks whether the signal is abnormal. If the signal is normal, in operation 251, the signal is set to be in a normal signal state. If the signal is abnormal, in operation 253, the signal is set to be in an abnormal signal state. When an input signal is set to be in a normal state, the input signal continues being displayed. When the input signal is set to be in an abnormal state, the input signal stops being displayed.

Figure 3:
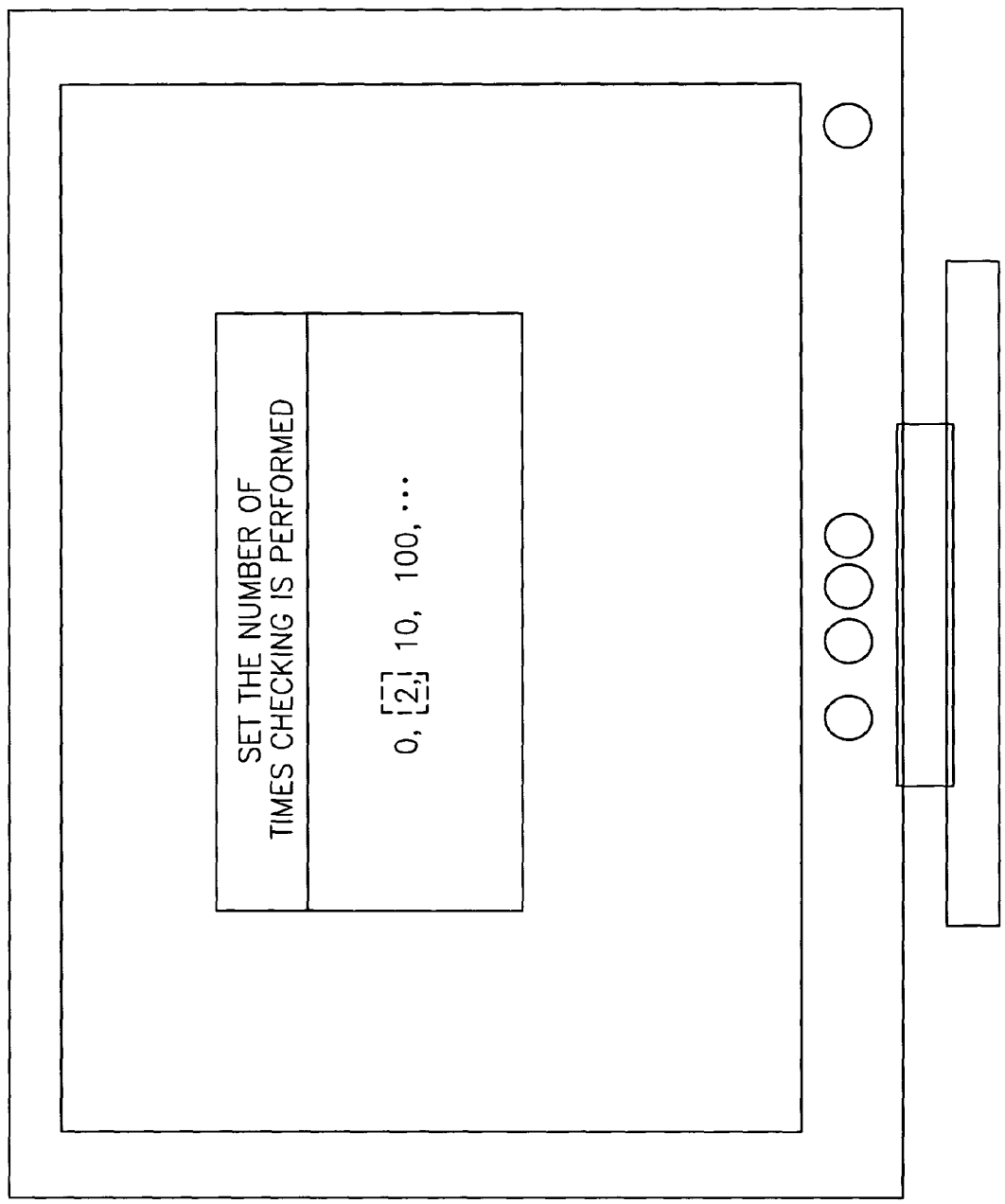
FIG. 3 is a view illustrating when a signal input to a display device is normal, the number of times the signal is checked is set according to an embodiment of the present invention.

FIG. 3 illustrates that when signals input to the display device 100 are normal, a user sets the number of times the signals are checked by watching a screen of the display unit 117 displayed according to an on-screen display method, where the number of times the signals are checked is set to be two, according to an embodiment of the present invention. Of course, one will recognize that the signal may be checked more or less than twice according to the present invention.

Figure 4:
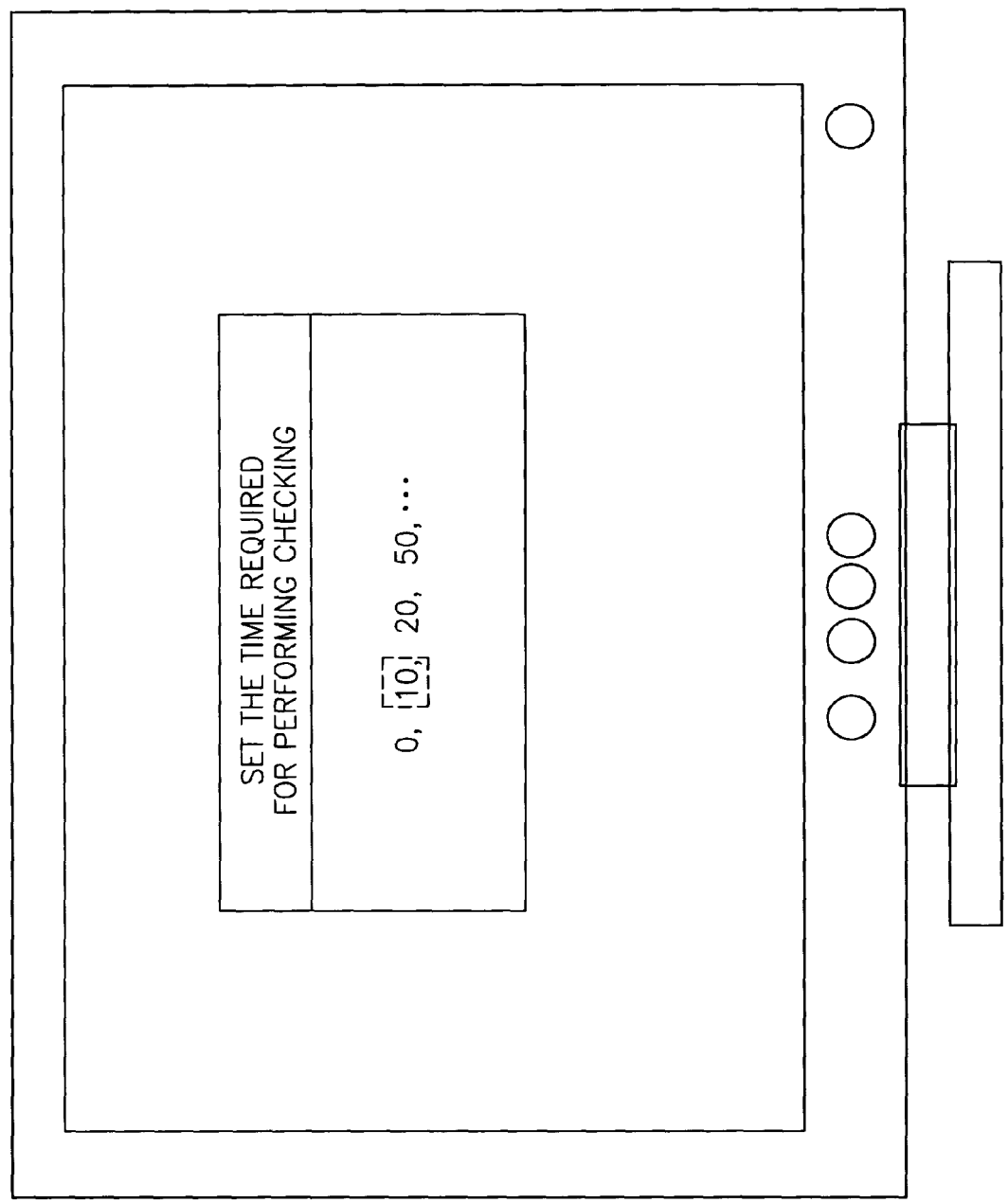
FIG. 4 is a view illustrating when a signal input to a display device is abnormal, the time required to check the signal is set according to an embodiment of the present invention.

FIG. 4 illustrates that when signals input to a display device are abnormal, a user sets the time required to check the signals by watching a screen of the display unit 117 displayed according to an on-screen display method, where the time required to check the signals is set to be 10 seconds, according to an embodiment of the present invention.

Figure 5:
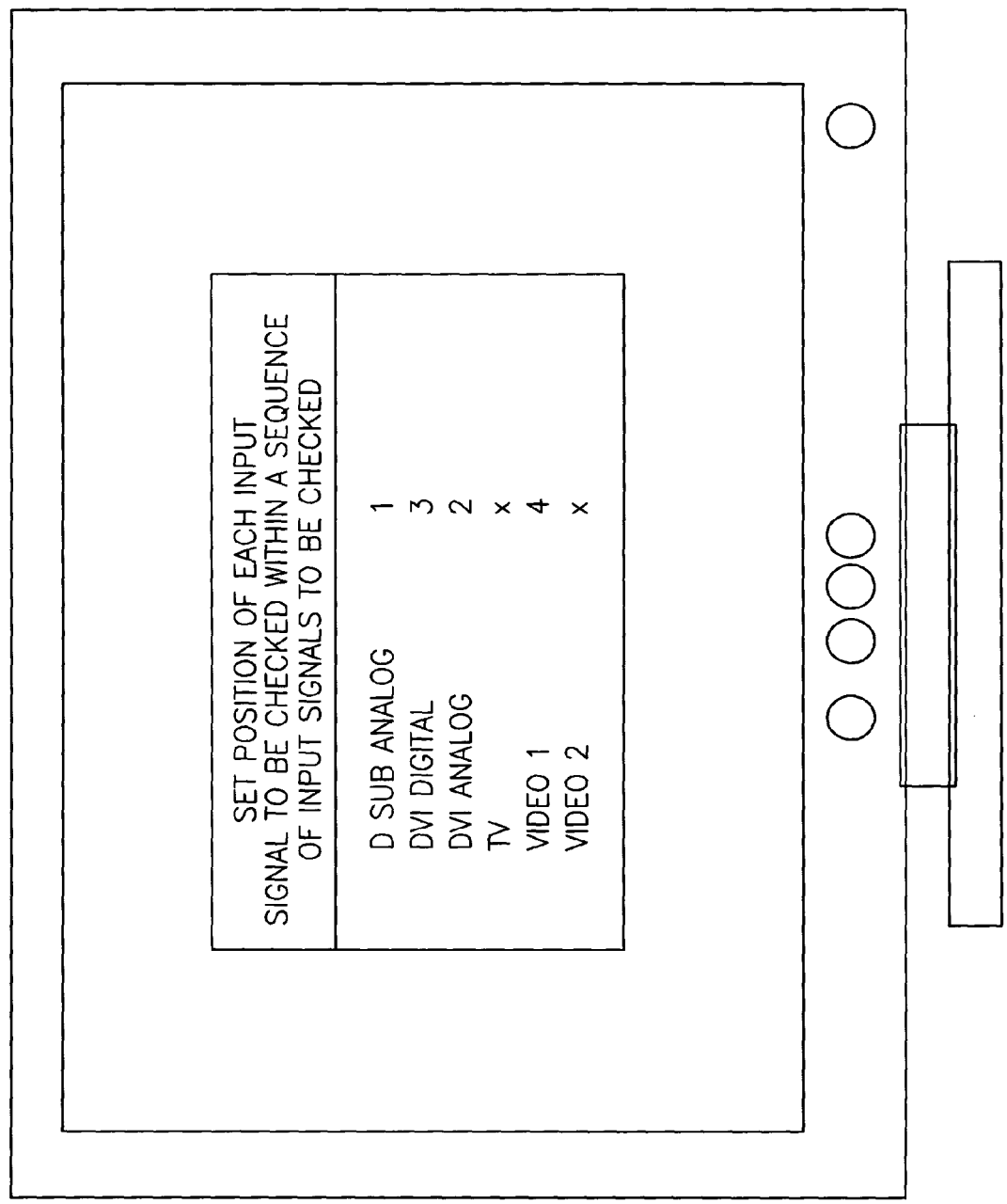
FIG. 5 is a view illustrating a menu showing which signal input to a display device is checked and which one of the signals is first checked according to an embodiment of the present invention.

FIG. 5 illustrates a menu from which a user can determine which signal input to the display device 100 is checked and which signal is first checked according to an embodiment of the present invention. Here, checking is performed in order of a D-sub analog signal, a DVI analog signal, a DVI digital signal, and a VIDEO 1 signal, and a TV signal and a VIDEO 2 signal are set not to be checked.

Figure 6:
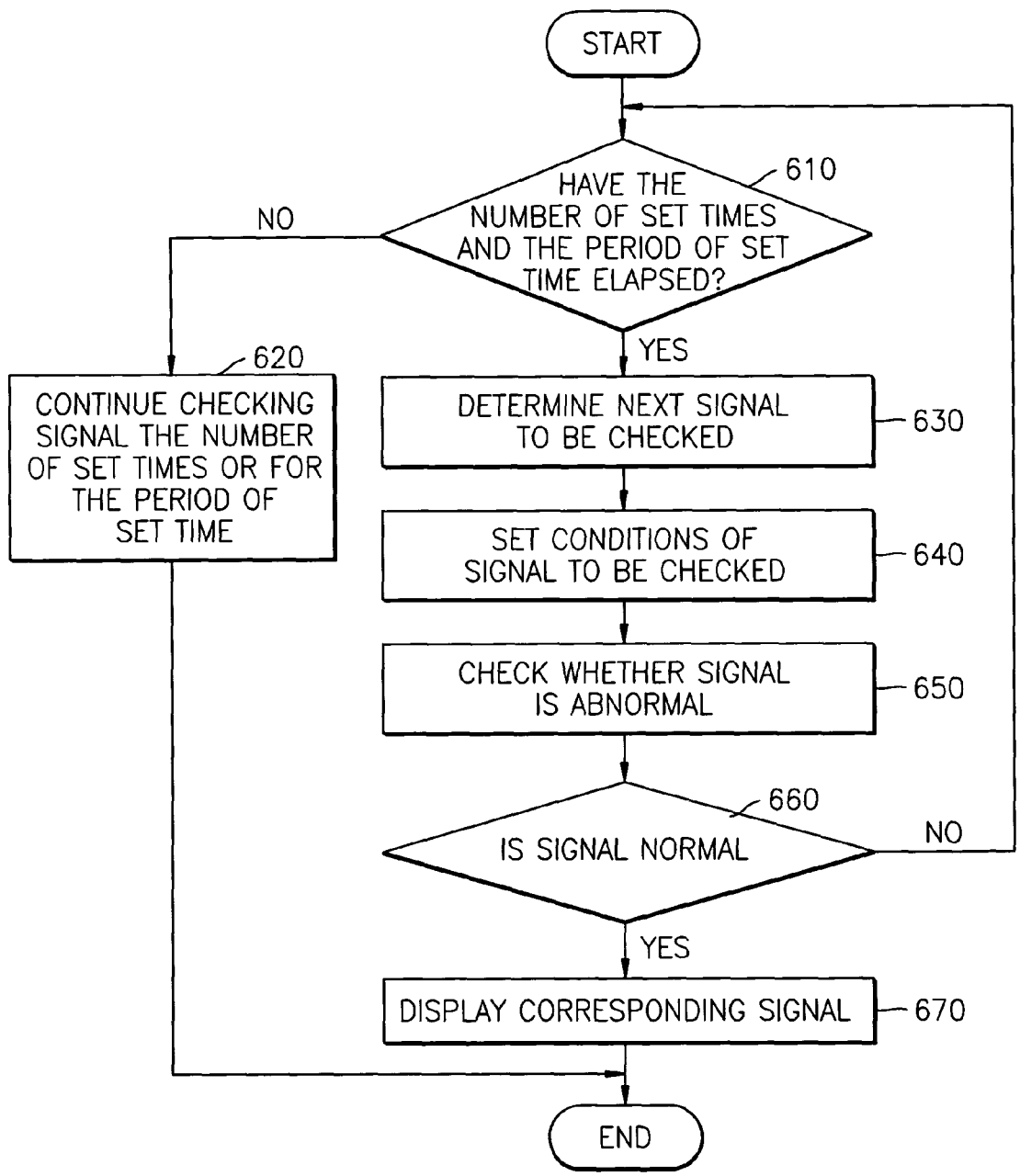
FIG. 6 is a flowchart for explaining a method of changing a signal input to a display device according to an embodiment of the present invention.

FIG. 6 is a flowchart for explaining a method of changing signal checking from a currently displayed signal to a next signal according to the order of checking signals input to the display device 100, according to an embodiment of the present invention.

If a currently displayed signal enters an abnormal mode, in operation 610, the signal controlling unit 116 determines whether the number of times the currently displayed signal is checked exceeds the number of times set by a user and whether the signal checking time set by the user has elapsed. If in operation 610, the signal controlling unit 116 determines that the number of times the currently displayed signal is checked does not exceed the number of times set by the user or the signal checking time has not elapsed, in operation 620, the signal checking unit 115 continues checking the currently displayed signal according to the number of times and the checking times that are set by the user. If in operation 610, the signal controlling unit 116 determines that the number of times the currently displayed signal is checked exceeds the number of times set by the user and the signal checking time has elapsed, in operation 630, the signal controlling unit 116 determines a next signal to be checked according to the signal checking order and in operation 640, sets conditions of the determined signal containing data on an input port corresponding thereto. The signal changing unit 114, in operation 650, then initiates checking whether the next signal, determined by the signal controlling unit 116, is abnormal. The signal checking unit 115 checks whether the determined signal is abnormal and in operation 660, the signal checking unit 115 determines whether the determined signal is normal. If in operation 660, it is determined that the checked signal is normal, in operation 670, the normal signal is displayed on the display unit 117. If in operation 660, the checked signal is not normal, the process goes to operation 610 which is repeated for all of the signals set by the data setting unit 112.

As is described above, according to an embodiment of the present invention, if a signal displayed on a display device 100 is abnormal, a checking process moves to a next signal to check the next signal, so that input signals are checked according to the checking order, the checking time, or the checking number of times preset by a user. Thus, a user can change a currently displayed signal to another signal without changing signals using a signal changing key and without manipulating an additional key. Of course, in an alternate embodiment of the present invention, the currently displayed signal may be changed to another signal automatically. As a result, signals can be quickly changed and the user can conveniently change signals.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A display device comprising:
   a signal identifying unit that receives an input signal and identifies the type of the input signal;
   a signal checking unit that checks whether the identified input signal is abnormal;
   a data setting unit that sets data corresponding to a user input regarding the received input signal, the set data representing how to check the identified input signal; and
   a signal changing unit that switches from the checked input signal to a next input signal to be checked based on the set data corresponding to the identified type of the input signal so that the signal checking unit checks whether the next input signal is abnormal, if the identified input signal is determined to be abnormal,
   wherein the signal checking unit senses whether an input signal cable is connected to the display device and only checks whether the identified input signal is abnormal by decoding the identified input signal when the input signal cable is connected to the display device.

2. The display device of claim 1, wherein the signal identifying unit identifies whether the received input signal is one of a D-sub analog signal, a DVI analog signal, a DVI digital signal, and a VIDEO signal.

3. The display device of claim 1, wherein the data setting unit sets one of a number of times the identified input signal is checked, a time required to check the identified input signal, and a position of the identified input signal to be checked within a sequence of identified input signals to be checked,
   wherein if the signal checking unit has not checked one of the number of set times whether the identified input signal is abnormal and has not checked for the period of set time whether the identified input signal is abnormal, the signal checking unit continues checking whether the identified input signal is abnormal.

4. The display device of claim 3, further comprising a signal controlling unit that checks the position of the checked input signal within the sequence of identified input signals to be checked to determine which identified input signal is to be checked after the checked input signal,
   wherein the signal changing unit switches from the checked input signal to the determined input signal so that the signal checking unit checks whether the determined input signal is abnormal.

5. A method of checking a signal input into a display device, the method comprising:
   receiving the input signal and identifying a type of the input signal that is received;
   checking whether the identified input signal is abnormal;
   setting data corresponding to a user input regarding the received input signal, the set data representing how to check the identified input signal; and
   switching from the checked input signal to a next input signal to be checked based on the set data corresponding to the identified type of the input signal so that whether the next input signal is abnormal is checked, if the input signal is checked and is determined to be abnormal,
   wherein the checking comprises sensing whether an input signal cable is connected to the display device and only determining whether the identified input signal is abnormal by decoding the input signal when the input signal cable is connected to the display device.

6. The method of claim 5, wherein the identifying comprises determining whether the input signal is one of a D-sub analog signal, a DVI analog signal, a DVI digital signal, and a VIDEO signal.

7. The method of claim 5, wherein the checking comprises setting one of a number of times the identified input signal is checked, a time required to check the identified input signal, and a position of the identified input signal to be checked within a sequence of identified input signals to be checked,
   wherein if the checking whether the identified input signal is abnormal has not been performed one of the number of set times and checking whether the identified input signal is abnormal has not been performed for the period of set time, checking whether the identified input signal is abnormal continues.

8. The method of claim 7, wherein the checking further comprises checking the position of the checked input signal within the sequence of identified input signals to be checked to determine which identified input signal is to be checked after the checked input signal,
   wherein the checked input signal is switched to the determined input signal so that whether the determined input signal is abnormal is checked.

9. A display device comprising:
   a signal identifying unit receiving an input signal and identifying the type of received input signal;
   a signal checking unit checking whether the identified input signal is abnormal or normal; and
   a signal changing unit switching from the checked input signal to check a next input signal based on set data corresponding to the received input signal so that the signal checking unit checks whether the next input signal is abnormal, the set data representing how to check the identified input signal,
   wherein the signal checking unit senses whether an input signal cable is connected to the display device and only checks whether the identified input signal is abnormal by decoding the identified input signal when the input signal cable is connected to the display device, and
   wherein if the checked input signal is normal, the signal continues being displayed by the display device and if the checked input signal is abnormal, the signal stops being displayed by the display device.

10. The display device of claim 9, wherein the identified input signal and the next input signal are abnormal if cables carrying the signals are not connected to the display device.

11. The display device of claim 9, wherein the identified input signal and the next input signal are abnormal if H-sync and V-sync patterns associated with the signals are abnormal.

12. The display device of claim 9, wherein the signal identifying unit identifies whether the received input signal is a D-sub analog signal.

13. The display device of claim 9, wherein the signal identifying unit identifies whether the received input signal is a DVI analog signal.

14. The display device of claim 9, wherein the signal identifying unit identifies whether the received input signal is a DVI digital signal.

15. The display device of claim 9, wherein the signal identifying unit identifies whether the received input signal is a VIDEO signal.

16. The display device of claim 9, further comprising a data setting unit that sets the number of times the identified input signal is checked, wherein if the signal checking unit has not checked the number of set times, the signal checking unit continues the checking.

17. The display device of claim 9, further comprising a data setting unit that sets the time required to check the identified input signal, wherein if the signal checking unit has not checked the identified input signal for the set period of time, the signal checking unit continues checking whether the identified input signal is abnormal.

18. The display device of claim 9, further comprising a data setting unit that sets the position of the identified input signal to be checked within a sequence of identified input signals to be checked.

19. The display device of claim 18, further comprising a signal controlling unit that checks the position of the checked input signal within the sequence of identified input signals to be checked to determine which identified input signal is to be checked after the checked input signal,
wherein the signal changing unit switches from the checked input signal to the determined input signal so that the signal checking unit can check whether the determined input signal is abnormal.

20. The display device of claim 9, further comprising a menu from which a user determines the identified input signal is to be checked and a checking order.

21. A method of checking a signal input into a display device, the method comprising:
receiving an input signal and identifying the type of received input signal;
checking whether the received and identified input signal is abnormal or normal; and
switching from the checked input signal to a next received and identified input signal based on set data corresponding to the received input signal to check whether the next received and identified input signal is abnormal, the set data representing how to check the identified input signal,
wherein the checking comprises sensing whether a signal input cable is connected and only checking whether the identified input signal is abnormal by decoding the input signal when the signal input cable is connected, and
wherein if the checked input signal is normal, the signal continues being displayed by the display device and if the checked input signal is abnormal, the signal stops being displayed by the display device.

22. The method of claim 21, wherein the identifying comprises identifying whether the input signal is a D-sub analog signal.

23. The method of claim 21, wherein the identifying comprises identifying whether the input signal is a DVI analog signal.

24. The method of claim 21, wherein the identifying comprises identifying whether the input signal is a DVI digital signal.

25. The method of claim 21, wherein the identifying comprises identifying whether the input signal is a VIDEO signal.

26. The method of claim 21, wherein the checking comprises checking whether a cable carrying the received and identified signal is connected to the display device.

27. The method of claim 21, wherein the checking comprises checking whether H-sync and V-sync patterns associated with the received and identified signal are abnormal.

28. The method of claim 21, wherein the checking comprises setting the number of times the input signal is checked, wherein if the checking whether the input signal is abnormal has not been performed the number of set times, the checking whether the input signal is abnormal continues.

29. The method of claim 21, wherein the checking comprises setting the time required to check the input signal, wherein if the checking whether the input signal is abnormal has not been performed for the period of set time, the checking whether the input signal is abnormal continues.

30. The method of claim 21, wherein the checking comprises checking the position of the input signal to be checked within a sequence of input signals to be checked.

31. The method of claim 30, wherein the checking further comprises checking the position of the checked input signal within the sequence of input signals to be checked to determine which input signal is to be checked after the checked input signal,
wherein the checked input signal is switched to the determined input signal so that whether the determined input signal is abnormal can be checked.

32. The method of claim 21, wherein the checking comprises determining from a menu the received and identified input signal to be checked and an order of checking.

33. The method of claim 21, further comprising:
continuing displaying the input signals if the input signals are in a normal state; and
stopping displaying the input signals if the input signals are in an abnormal state.

34. A displaying device having a plurality of input ports comprising:
an input port selection unit for selecting an input port for receiving an input signal;
a signal checking unit for checking whether the selected input port is receiving a normal input signal; and
an input port changing unit for switching from the checked input port to a next input port when the input port is not receiving a normal input signal, wherein at least one of the input ports has priority in an order of checking by the signal checking unit as compared to another input port,
wherein the signal checking unit senses whether a cable via which each signal is input is connected and only checks whether the input signal is normal by decoding the input signal when the cable via which each signal is input is connected, and
wherein at least one of the input ports has priority in an order of checking by the signal checking unit as compared to another input port.

35. The displaying device of claim 34, wherein the order of checking of the input port is selected among a plurality of checking orders.

36. The displaying device of claim 35, wherein the checking order is set by the user.

37. The displaying device of claim 36 wherein a menu is provided on a screen of the displaying device to set the checking order.

38. The displaying device of claim 34, wherein the input port selection unit selects whether the input signal is one of a D-sub analog signal, a DVI analog signal, a DVI digital signal, and a VIDEO signal.

39. The displaying device of claim 34, wherein the displaying device is capable of displaying a computer signal.

40. A displaying device comprising:
an analog input port for receiving an analog signal;
a digital input port for receiving a digital signal; and
an input port changing unit for switching from the analog input port to the digital input port to check whether the digital signal is normal when the displaying device determines that the analog input port is not receiving a normal analog input signal, the switching from the analog input port to the digital input port being based on set data corresponding to the analog signal, the set data representing how to check the analog signal, wherein whether the analog input port receives the normal analog input signal is determined by sensing whether a cable via which each signal is input is connected and only decoding the input signal to determine whether the analog signal is abnormal when the cable via which each signal is input is connected.

41. A displaying device comprising:

an analog input port for receiving an analog signal;

a digital input port for receiving a digital signal; and an input port changing unit for switching from the digital input port to the analog input port to check whether the analog signal is normal when the displaying device determines that the digital input port is not receiving a normal digital input signal, the switching from the digital input port to the analog input port being based on set data corresponding to the digital signal, the set data representing how to check the digital signal, wherein whether the digital input port receives the normal digital input signal is determined by sensing whether a cable via which each signal is input is connected and only decoding the input signal to determine whether the analog signal is abnormal when the cable via which each signal is input is connected.

42. A method of checking a signal input into a displaying device, the method comprising:

selecting an input port among a plurality of input ports for receiving an input signal;

checking whether the selected input port is receiving a normal input signal; and switching from the checked input port to a next input port to be checked when a normal input signal is not being received from the selected input port, wherein at least one of the input ports has priority in an order of checking by the signal checking unit as compared to another input port, wherein whether the input signal is normal is checked by sensing whether a cable via which each signal is input is connected and only decoding the input signal to determine whether the input signal is abnormal when the cable via which each signal is input is connected, and wherein at least one of the input ports can be set to have a priority in an order of checking by the signal checking unit as compared to another input port.

43. The method of claim 42, wherein the selecting step selects a D-sub analog port for a D-sub analog signal.

44. The method of claim 42, wherein the selecting step selects a DVI analog port for a DVI analog signal.

45. The method of claim 42, wherein the selecting step selects a DVI digital port for a DVI digital signal.

46. The method of claim 42, wherein the selecting step selects a VIDEO port for a VIDEO signal.

47. The method of claim 42, wherein whether the input signal is abnormal is checked by checking whether H-sync and V-sync patterns associated with the received signal are abnormal.

48. The method of claim 42, wherein the order of checking of the input port is selected among a plurality of checking orders.

49. The method of claim 48, wherein the checking order is selected by the user.

50. The method of claim 49, a menu is provided on a screen of the display device to set the checking order.

* * * * *

UNITED STATES PATENT AND TRADEMARK OFFICE
CERTIFICATE OF CORRECTION

PATENT NO. : 7,982,726 B2  Page 1 of 1
APPLICATION NO. : 10/654618
DATED : July 19, 2011
INVENTOR(S) : Young-chan Kim et al.

It is certified that error appears in the above-identified patent and that said Letters Patent is hereby corrected as shown below:

On the Cover Page item (75), Line 1, Delete "Urwang-si (KR)" and insert -- Uiwang-si (KR) --, therefor.

Signed and Sealed this
Eighth Day of January, 2013

David J. Kappos
*Director of the United States Patent and Trademark Office*